(12) United States Patent
Miyazaki et al.

(10) Patent No.: US 7,270,164 B2
(45) Date of Patent: Sep. 18, 2007

(54) PNEUMATIC TIRE

(75) Inventors: Shinichi Miyazaki, Kobe (JP); Osamu Toda, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 10/366,658

(22) Filed: Feb. 14, 2003

(65) Prior Publication Data

US 2004/0007306 A1 Jan. 15, 2004

(30) Foreign Application Priority Data

Feb. 14, 2002 (JP) .............................. 2002-37150
Feb. 14, 2002 (JP) .............................. 2002-37151

(51) Int. Cl.
  *B60C 9/22* (2006.01)
  *B60C 9/00* (2006.01)
(52) U.S. Cl. ...................... 152/537; 152/527
(58) Field of Classification Search ........ 152/450–451, 152/526–527, 537, 548, 556, 564
  See application file for complete search history.

(56) References Cited

U.S. PATENT DOCUMENTS

| | | | | |
|---|---|---|---|---|
| 4,046,183 A | * | 9/1977 | Takahashi et al. | 152/541 |
| 4,289,184 A | * | 9/1981 | Motomura et al. | 152/541 |
| 4,630,663 A | * | 12/1986 | Bell et al. | 152/541 |
| 5,385,193 A | * | 1/1995 | Suzuki et al. | 152/525 |
| 5,855,704 A | * | 1/1999 | Reuter | 152/527 |
| 5,968,295 A | * | 10/1999 | Kohno et al. | 152/527 |
| 6,026,879 A | * | 2/2000 | Reuter | 152/527 |
| 6,082,423 A | * | 7/2000 | Roesgen et al. | 152/209.1 |
| 6,279,634 B1 | * | 8/2001 | Kohno et al. | 152/527 |
| 6,386,257 B1 | * | 5/2002 | Kohno et al. | 152/527 |
| 6,511,747 B1 | * | 1/2003 | Cho et al. | 428/364 |
| 6,568,445 B1 | * | 5/2003 | Kojima | 152/526 |
| 6,634,399 B1 | * | 10/2003 | Sykora et al. | 152/556 |
| 6,701,986 B2 | * | 3/2004 | Tanaka | 152/209.14 |

FOREIGN PATENT DOCUMENTS

| | | |
|---|---|---|
| EP | 0 749 854 A1 | 12/1996 |
| EP | 1 167 082 A2 | 1/2002 |
| EP | 1 022 163 A3 | 7/2002 |

* cited by examiner

*Primary Examiner*—Jason R. Bellinger
(74) *Attorney, Agent, or Firm*—Birch, Stewart, Kolasch & Birch, LLP

(57) ABSTRACT

A pneumatic tire is provided which includes a carcass extending between bead portions, and a belt disposed radially outside the carcass in the tread portion. At least one of the carcass and belt includes a cord ply of a polyethylene-2,6-naphthalate fiber cord. The polyethylene-2,6-naphthalate fiber cord has a total denier number of from 2500 to 3600, a twist number of from 30 to 40 turns/10 cm, an initial stage modulus at 25 deg. C. in a range of from 50 to 65 gf/d, and a variation of the initial stage modulus at between 25 to 70 deg. C. which is not more than 20% in absolute value.

7 Claims, 2 Drawing Sheets

PNEUMATIC TIRE

BACKGROUND OF INVENTION

1. Field of Invention

The present invention relates to a pneumatic tire, more particularly to a carcass and tread band structure in which specific polyethylene-2,6-naphthalate fiber cords are used to improve tire performance such as steering stability, ride comfort, rolling resistance, road noise and durability.

2. Description of Related Art

In the radial tires for high-speed use such as passenger car tires for example, a tread band is usually provided on the radially outside of the breaker to improve high-speed durability of the tire.

As a result of inventors' study, it was found that road noise (running noise heard inside the car) around 250 Hz can be reduced by using high modulus cords in the tread band. But, it is also found that the road noise can not be effectively reduced if the band cord modulus is simply increased because the stretch of the band during tire vulcanization becomes insufficient as the modulus increases and as a result the vulcanized tire is slightly deformed. Although such deformation is small, vibration is caused during high-speed running and thereby the running noise is deteriorated.

On the other hand, use of high-modulus cords in the carcass become popular in order to reduce the tire weight to improve fuel consumption and improve steering stability and the like. In this case, however, as the sidewall rigidity increases, the ride comfort is liable to deteriorate. Further, there is a possibility of deteriorating the rolling resistance of the tire depending on the cord material.

It is therefore, an object of the present invention to provide a pneumatic tire, in which the above-mentioned problems can be solved and tire performance such as steering stability, ride comfort, rolling resistance, road noise and durability can be improved in a well-balanced manner by using a polyethylene-2,6-naphthalate fiber cord in the carcass and/or band.

SUMMARY OF THE INVENTION

According to the present invention, a pneumatic tire includes a tread portion, a pair of sidewall portions, a pair of bead portions each with a bead core therein, a carcass extending between the bead portions, and a belt disposed radially outside the carcass in the tread portion, wherein at least one of the carcass and the belt comprises a PEN cord ply of a polyethylene-2,6-naphthalate fiber cord which has a total denier number of from 2500 to 3600, a twist number of from 30 to 40 turns/10 cm, an initial stage modulus at 25 deg. C. which is in a range of from 50 to 65 gf/d, and a variation of the initial stage modulus in a temperature range between 25 deg. C to 70 deg. C. which is not more than 20% in absolute value, the PEN cord ply of the carcass comprises a plurality of the polyethylene-2,6-naphthalate fiber cords which are arranged radially at an angle of from 70 to 90 degrees with respect to the tire equator, and each of the cords has a loss tangent of from 0.06 to 0.09, a complex elastic modulus of from 2800 to 4000 N/cord, and a variation of the loss tangent in the temperature range between 25 deg. C. and 70 deg. C. which is not more than 20% in absolute value, and a variation of the complex elastic modulus in the temperature range between 25 deg. C. and 70 deg. C. which is not more than 20% in absolute value, and the PEN cord ply of the belt comprises at least one polyethylene-2,6-naphthalate fiber cord which is wound spiral at an angle of not more than 5 degrees with respect to the tire equator.

BRIEF DESCRIPTION OF THE DRAWINGS

Embodiments of the present invention will now be described in detail in conjunction with the accompanying drawings.

FIG. 3 shows an arrangement of the cords Cbd of the band ply 9A, the cords Cbk of the breaker plies 7A and 7B, and the cords Cca of the carcass ply 6a.

DETAILED DESCRIPTION OF THE INVENTION

Figure 1:
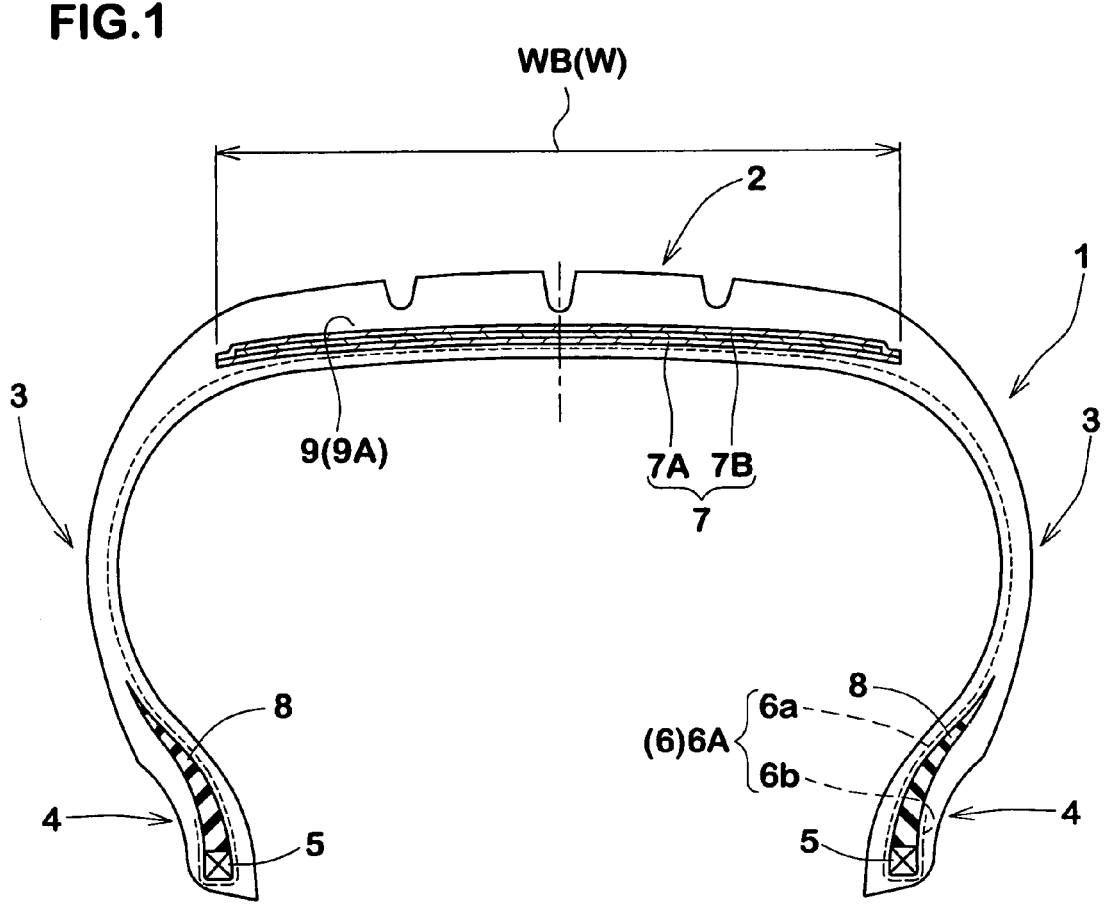
FIG. 1 is a cross sectional view of a pneumatic tire according to the present invention.
Figure 3:
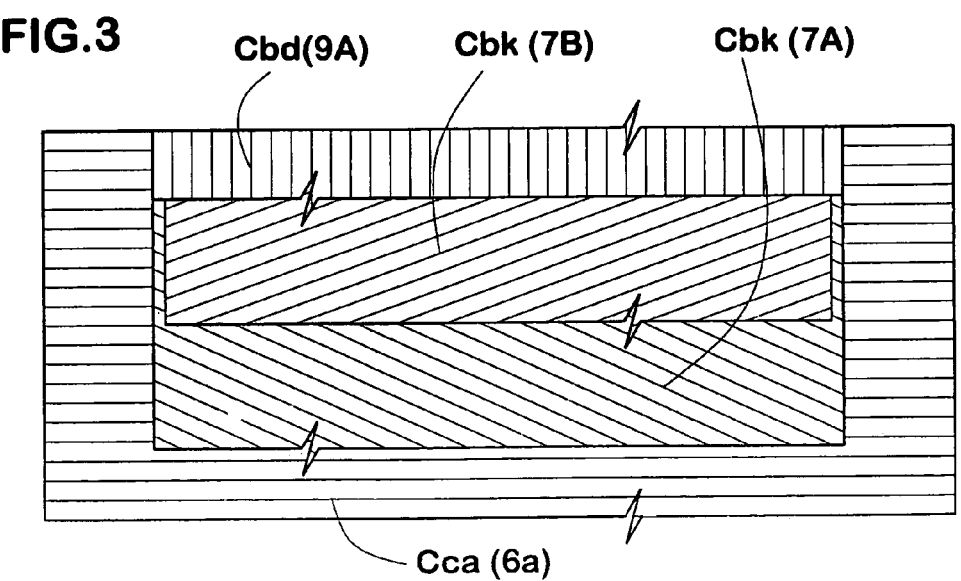

In the drawings, pneumatic tire 1 according to the present invention comprises a tread portion 2, a pair of sidewall portions 3, a pair of bead portions 4 each with a bead core 5 therein, a carcass 6 extending between the bead portions 4, and a tread reinforcing belt disposed radially outside the carcass 6 in the tread portion.

In the following embodiments, pneumatic tire 1 is a radial tire for passenger cars.

The carcass 6 comprises at least one ply 6A of cords arranged radially at an angle of from 70 to 90 degrees with respect to the tire circumferential direction, extending between the bead portions through the tread portion and sidewall portions, and turned up around the bead core 5 in each of the bead portions so as to form a pair of turned up portions 6b and a main portion 6a therebetween.

In each of the bead portions 4, between the main portion 6a and turned up portion 6b, there is provided with a rubber bead apex 8 extending radially outwardly from the bead core 5 while tapering towards its radially outer end.

The belt comprises a breaker 7 and optional band 9.

The breaker 7 is composed of at least two cross plies 7A and 7B of parallel cords laid at an angle of from 10 to 35 degrees with respect to the tire equator. In order to reinforce the tread portion, the breaker 7 extends across the substantially overall width of the tread portion 2. Thus, high-strength cords such as steel cords and the like are used as breaker cords.

The band 9 is disposed on the radially outside of the breaker 7 to cover at least the axial edges of the breaker 7 in order to control lifting of the tread edges during high-speed rotation of the tire. Thus, the cord angle is not more than 5 degrees with respect to the tire equator. The band 9 can be composed of a full-width band ply extending across the substantially overall width of the breaker 7. Further, the band can be formed as an edge band made up of axially spaced two plies or parts covering the breaker edges only. Furthermore, a combination of a full-width band ply and a pair of edge band plys is also possible.

Figure 2:
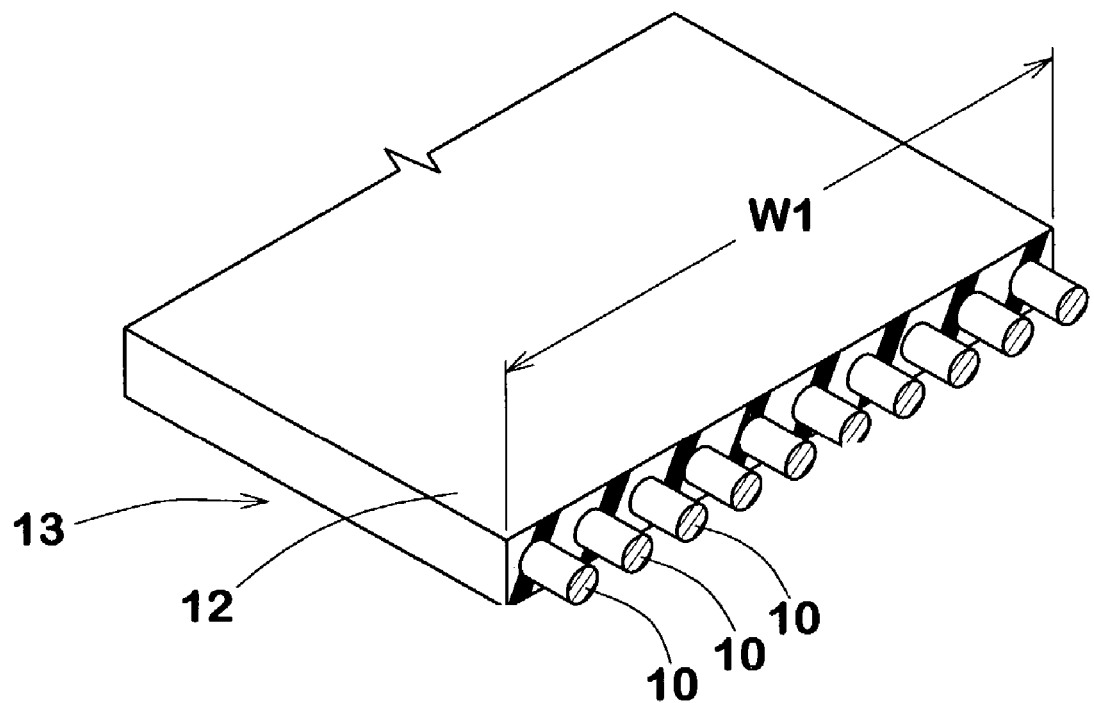
FIG. 2 is a perspective partial view of a tape.

The band 9 can be formed by spirally winding a single cord or a plurality of cords. But, for the productivity, accuracy of cord spacing and the like, it is preferably formed by spirally winding a tape 13 instead of a cord or cords alone. The tape 13 is, as shown in FIG. 2, a rubber tape in which a single cord or plural cords 10 are embedded in its topping rubber 12 in parallel with each other along the longitudinal direction of the tape. The illustrated example comprises about ten parallel cords 10 and has a width W1 of about 10 mm.

According to the present invention, PEN cords are used in one of or each of the carcass and band.

The PEN cord is a polyethylene-2,6-naphthalate fiber cord which is formed by twisting a large number of fibers together at a twist coefficient of 30 to 40 turns/10 cm. As the material of the fibers, it is, of course, possible to use homopolymer of polyethylene-2,6-naphthalate. But, it is also possible to use, copolymers of at least 85 mol % of polyethylene-2,6-naphthalate and at most 15 mol % of another component or components such as terephthalic acid, isophthalic acid, diphenyldicarboxylic acid and diphenylether dicarboxylic acid, and further naphthalene dicarboxylic acid other than 2,6-naphthalene dicarboxylic acid.

In this embodiment, the PEN cord is formed such that a plurality of strands each formed by twisting PEN fibers together (strand-twist), are twisted together into a cord (cord-twist), wherein the direction of strand-twist is reverse to the direction of cord-twist, and the strand-twist and cord-twist are in a range of from 30 to 40 turns/10 cm. It is preferable that the strand-twist number is the same as the cord-twist number. If the twist numbers are less than 30 turns/10 cm, the elongation and fatigue resistance of the cords become insufficient and it is difficult to obtain necessary durability for the carcass/band. If the twist numbers are more than 40 turns/10 cm, it becomes difficult to set the undermentioned initial stage modulus M in the preferred range. Further, dimensional stability and the tire durability are liable to deteriorate because the elongation of the carcass/band increases. By setting the twist numbers as above, it becomes possible to improve the strength, elongation and resistance to fatigue in a well-balanced manner.

The total denier of the fibers constituting a PEN cord is set in a range of from 2500 to 3600. If the total denier is less than 2500, as the strength of the individual cord greatly decreases, in order to provide a necessary strength for the carcass/band, increase of the carcass ply number/band ply number may be necessitated. If the total denier increases over 3600, the thickness of the carcass/band is accordingly increased. In either case, it is not preferable in view of tire weight reduction. Thus, the total denier is set in the range of 2500 to 3600. This is also necessary for the tire rigidity and strength.

In general, the carcass cords and band cords embedded in the finished tire are subjected to small elongation of about 1 to 3% due to the stretch during tire vulcanization.

The initial stage modulus M of the carcass cords, that is, the modulus at low elongation is an important factor of improving the tire rigidity. Therefore, in order to improve steering stability and ride comfort in a well-balanced manner, the initial stage modulus M at 25 deg. C. of the carcass cords is set in a range of from 50 to 65 gf/d, and further the complex elastic modulus E* thereof is set in a range of from 2800 to 4000 N/cord. if the initial stage modulus M and complex elastic modulus E* are less than the respective lower limits, the steering stability may be deteriorated. If over the upper limits, ride comfort may be deteriorated.

Also the initial stage modulus M of the band cords is an important factor of improving the hoop effect of the band. Therefore, in order to improve the hoop effect of the band in the finished tire and to provide a suitable stretch during vulcanization in a well-balanced manner, the initial stage modulus M at 25 deg. C. of the band cords is set in a range of from 50 to 65 gf/d. If the initial stage modulus M is less than 50 gf/d, the hoop effect becomes insufficient. If more than 65 gf/d, the tire is liable to deform due to unsuitable cord stretch. In either case, it is difficult to reduce the road noise.

During running, on the other hand, the temperature of the tire internal structure increases and sometimes reaches to 70 deg. C. or more. Thus, the variations of the modulus M and complex elastic modulus E* should be controlled as small as possible in such a temperature range.

Therefore, in a temperature range between 25 deg. C. and 70 deg. C., the variation of the initial stage modulus M and the variation of the complex elastic modulus E* are each limited to not more than 20% in absolute value. More specifically, a difference Mmax−M25 and a difference M25−Mmin between the initial stage modulus M25 at 25 deg. C. and a maximum Mmax and a minimum Mmin of the initial stage modulus in the temperature range of from 25 deg. C. to 70 deg. C. are each not more than 20% of the initial stage modulus M25 at 25 deg. C. And a difference E*max−E*25 and a difference E*25−E*min between the complex elastic modulus E*25 at 25 deg. C. and a maximum E*max and a minimum E*min of the complex elastic modulus in the temperature range of from 25 deg. C. to 70 deg. C. are each not more than 20% of the complex elastic modulus E*25 at 25 deg. C. In case of carcass cords, these parameters under 20% are preferably further limited to under 15%, more preferably under 10% in view of the steering stability and ride comfort. In case of band cords, similarly, these parameters under 20% are preferably further limited to under 15%, more preferably under 10% in view of road noise reduction because if the variation is more than 20%, the tension of the band cords decreases greatly as the temperature raises which is not preferable in view of not only hoop effect but also road noise.

Further, in view of the rolling resistance of the tire and heat generation during running, it is preferable that the loss tangent (tan δ) of the carcass/band cord is decreased. Therefore, the loss tangent (tan δ) at 25 deg. C. of the PEN cord is set in a range of from 0.06 to 0.09. Preferably, the variation of the loss tangent (tan δ) in the temperature range of from 25 deg. C. to 70 deg. C. is set in a range of not more than 20%, more preferably not more than 15%, still more preferably not more than 10%. More specifically, a difference tan δ max-tan δ 25 and a difference tan δ 25-tan δ min between the complex elastic modulus tan δ 25 at 25 deg. C. and a maximum tan δ max and a minimum tan δ min of the loss tangent (tan δ) in the temperature range of from 25 deg. C. to 70 deg. C. are each not more than 20% of tan δ 25 at 25 deg. C.

Here, the initial stage modulus M corresponds to the inclination of a tangential line to the load-elongation curve of the cord at the origin which curve is obtained according to the Japanese Industrial standard L1017 "Testing Methods for chemical Fiber Tire cords". The loss tangent (tan δ) and complex elastic modulus (E*) were measured with a viscoelastic spectrometer of IWAMOTO SEISAKUSYO make using a 30 mm long specimen (cord). The measuring conditions are as follows: initial load of 1000 g/cord; initial elongation of 10%; dynamic strain of 0.01 mm; and frequency of 10 Hz.

In order to decrease the variations as above, the following parameters of the above-mentioned material of the PEN cord fibers are preferably limited as follows: the ethylene-2,6-naphthalate is more than 90 mol %; the peak of differential scanning calorimetry (DSC) is not less than 280 deg. C.; the limiting viscosity number is not less than 0.7; and the index of double refraction is not less than 0.30. Further, there is a possibility of controlling the variations by changing: conditions of RFL (resorcin-formalin-latex) treating; and/or physical parameters of the PEN cord such as twist number, denier number of the individual fiber, the number of the fibers, and the like.

The number of the fibers in a cord is preferably set to be not less that 400 for the ride comfort, but not more than 600 for the steering stability.

It is preferable that the elongation of the carcass/band cord under load of 2.0 gf/d is set in a range of from 0.5 to 2.5% in view of dimensional stability of the tire and tire uniformity which affects road noise.

Embodiment 1

An embodiment such that the above-mentioned PEN cords are used in each of the carcass 6 and band 9 in the tire structure shown in FIG. 1 will be described.

The carcass 6 in this example is composed of a radial ply 6A of PEN cords arranged radically at an angle of 90 degrees with respect to the tire equator, extending between the bead portions 4 through the tread portion 2 and sidewall portions 3, and turned up around the bead core 5 in each of the bead portions 4 so as to form a pair of turned up portions 6b and a main portion 6a therebetween.

The breaker 7 in this example is composed of a radially outer ply 7B and a widest radially inner ply 7A.

The band 9 in this example extends continuously across the substantially overall width WB of the breaker 7, and the band is composed of a full-width band ply 9A of PEN cords. The band width W is not less than 95% of the breaker width WB, in this example, the substantially same as the breaker width WB. The band ply 9A or band 9 is formed by spirally winding a rubber tape 13 as described above and shown in FIG. 2.

Embodiment 2

It is also possible that the above-mentioned PEN cords are used in only the band 9. In such a case, as the carcass cords, organic fiber cords such as nylon, polyester, rayon, aromatic polyamide and the like may be used for the passenger car tires. Further, steel cords may be used depending on the intended use of the tire. The band 9 may be formed as various types aside from the above-mentioned a single-ply full-width band.

Embodiment 3

In case the belt is made up of the breaker 7 only, namely, the band 9 is omitted, it is possible that the above-mentioned PEN cords are used in only the carcass 6. The carcass 6 is preferably composed of a single ply of the PEN cords. However, this not necessarily means that the carcass 6 excludes an additional ply which may be of the PEN cord or another material cord.

By the PEN cord used in the band, the hoop effect of the band is improved, and as a result, the circumferential rigidity of the tread portion 2 becomes increased and uniformed, and vibrations caused by unevenness of the road surface during running can be controlled to reduce the road noise. In case of aromatic polyamide fiber cord having very high modulus, it is difficult to obtain a suitable stretch during vulcanization. As a result, the tire is liable to deform. Although such deformation is small, it sometimes affect the road noise. Further, as compared with polyethylene-2,6-naphthalate fibers, energy loss of the aromatic polyamide fibers is relatively large. Therefore, it has a disadvantage for the rolling resistance and heat generation. In case of polyethylene terephthalate fiber cord having low modulus, the road noise can not be fully reduced. In case of polyethylene-2,6-naphthalate fiber cord, it is possible to provide an initial stage modulus M of from 50 to 65 gf/d while setting the twist number in the range of 30 to 40 turns/10 cm. As a result, it becomes possible to improve the strength, elongation, resistance to fatigue well-balannedly.

Comparison Test 1

Test tires of size 195/65R15 having the structure shown in FIG. 1 and specifications given in Table 1 were made and tested for steering stability, ride comfort, rolling resistance and road noise.

Steering Stability Test:

A 1800 cc passenger car provided with test tires (pressure 200 kPa) was run on a dry asphalt road, and the steering stability was evaluated into ten ranks by the test driver's feelings during straight running and cornering, wherein the larger the rank number, the better the steering stability.

Ride Comfort Test:

The test car was run on rough roads in a ride comfort test course, and the test driver evaluated the ride comfort into ten ranks, based on harshness, damping, thrust-up, etc., wherein the larger the rank number, the better the ride comfort.

Rolling Resistance Test:

After warm-up of thirty-minutes running at a speed of 80 km/h, the test car was stopped on a ten-degree down slope at six meter height from a horizontal road surface extending from the lower end of the slope, and the wheel brake was released in neutral to allow the test car to go down by gravitation. Then, the total running distance until the test car made a stop by itself was measured. The distance was indicated by an index based on Ref.A1 being 100, wherein the larger the index number, the smaller the rolling resistance.

Road Noise Test:

The test car was coasted on a smooth road surface in a noise test course at a speed of 80 km/h and the noise level (dB) in 250 Hz band was measured with a microphone fixed at the driver's seat. The results are indicated in Table 1 by an index based on Ref.A1 being 100, wherein the smaller the index number, the better the road noise.

TABLE 1

| Tire | Ref.A1 | Ref.A2 | Ref.A3 | Ref.A4 | Ex.A1 | Ex.A2 |
|---|---|---|---|---|---|---|
| Carcass | | | | | | |
| Number of ply | 1 | 1 | 1 | 1 | 1 | 1 |
| Cord angle (deg.) to tire equator | 90 | 90 | 90 | 90 | 90 | 90 |
| Cord count/5 cm | 50 | 50 | 50 | 50 | 50 | 50 |

TABLE 1-continued

| Tire | Ref.A1 | Ref.A2 | Ref.A3 | Ref.A4 | Ex.A1 | Ex.A2 |
|---|---|---|---|---|---|---|
| Cord material | nylon 66 1500 d/2 | PET 1500 d/2 | PEN 940 d/2 | Aramid 1500 d/2 | PEN 1500 d/2 | PEN 1500 d/2 |
| Total denier | 3000 | 3000 | 1880 | 3000 | 3000 | 3000 |
| Twist number (turns/10 cm) | 18, 38 | 40, 40 | 15, 15 | 43, 43 | 35, 35 | 35, 35 |
| Number of fibers | 420 | 768 | 496 | 2000 | 496 | 496 |
| Initial stage modulus @ 25 deg. C. (gf/d) | 19 | 45.3 | 48 | 86.7 | 56 | 56 |
| (Variation % between 25 and 70 deg. C.) | −21 | −3 | −10 | −25 | −7 | −7 |
| Loss tangent (tan δ) @ 25 deg. C. | 0.033 | 0.046 | 0.078 | 0.093 | 0.075 | 0.075 |
| (Variation % between 25 and 70 deg. C.) | 76 | −2 | 10 | 8 | 9 | 9 |
| Complex elastic modulus E* @ 25 deg. C. (N/cord) | 1150 | 1900 | 2850 | 5300 | 3230 | 3230 |
| (Variation % between 25 and 70 deg. C.) | −24 | −6 | −21 | −7 | −19 | −19 |
| Band *1 | | | | | | |
| Cord material | nylon 66 1260 d/2 | nylon 66 1260 d/2 | nylon 66 1260 d/2 | nylon 66 1260 d/2 | nylon 66 1260 d/2 | PEN *2 1500 d/2 |
| Breaker | | | | | | |
| Number of ply | 2 | 2 | 2 | 2 | 2 | 2 |
| Cord | 1 × 3/0.27 steel cord | 1 × 3/0.27 steel cord | 1 × 3/0.27 steel cord | 1 × 3/0.27 steel cord | 1 × 3/0.27 steel cord | 1 × 3/0.27 steel cord |
| Cord angle (deg.) | +20/−20 | +20/−20 | +20/−20 | +20/−20 | +20/−20 | +20/−20 |
| Cord count/5 cm | 40 | 40 | 40 | 40 | 40 | 40 |
| Steering stability | 100 | 103 | 106 | 106 | 114 | 115 |
| Ride comfort | 100 | 102 | 101 | 99 | 108 | 107 |
| Rolling resistance | 100 | 103 | 102 | 94 | 103 | 103 |
| Road noise | 100 | 97 | 98 | 99 | 93 | 89 |

PET: polyethylene terephthalate fiber, PEN: polyethylene-2,6-naphthalate fiber
*1 Each band was made of a single full-width ply formed by spirally winding a 10 mm width tape, and the cord count was 49/5 cm.
*2 Same as Carcass cord From the test results, it was confirmed that the steering stability, ride comfort and rolling resistance can be improved well-balancedly.

Comparison Test 2

Test tires of size 195/65R15 having the structure shown in FIG. 1 and the specifications shown in Table 2 were made and tested for the durability and road noise.

Road Noise Test:
same as above

Durability Test:
using a tire test drum, the runable distance was measured under the following accelerated condition: 150% of the maximum tire load specified in Japanese Industrial standard (JIS); 80% of the pressure specified in JIS; and a speed of 80 km/h. The distance is indicated by an index based on Ref.B1 being 100, wherein the larger the index number, the better the durability.

TABLE 2

| Tire | Ref.B1 | Ref.B2 | Ref.B3 | Ref.B4 | Ex.B |
|---|---|---|---|---|---|
| Carcass | | | | | |
| Number of ply | 1 | 1 | 1 | 1 | 1 |
| Cord Material | PET 1670 dtex/2 | PET 1670 dtex/2 | PET 1670 dtex/2 | PET 1670 dtex/2 | PET 1670 dtex/2 |
| Cord angle (deg.) | 90 | 90 | 90 | 90 | 90 |
| Cord count/5 cm | 50 | 50 | 50 | 50 | 50 |
| Breaker | | | | | |
| Number of ply | 2 | 2 | 2 | 2 | 2 |
| Cord | steel 1 × 3/0.27 | steel 1 × 3/0.27 | steel 1 × 3/0.27 | steel 1 × 3/0.27 | steel 1 × 3/0.27 |
| Cord angle (detg.) | +20/−20 | +20/−20 | +20/−20 | +20/−20 | +20/−20 |
| Cord count/5 cm | 40 | 40 | 40 | 40 | 40 |
| Band *1 | | | | | |
| Cord material | nylon 66 1500 d/2 | PET 1500 d/2 | PEN 940 d/2 | Aramid 1500 d/2 | PEN 1500 d/2 |
| Total denier | 3000 | 3000 | 1880 | 3000 | 3000 |
| Twist number (turns/10 cm) | 38, 38 | 40, 40 | 15, 15 | 43, 43 | 35, 35 |
| Initial stage modulus @ 25 deg. (gf/d) | 19 | 45.3 | 48 | 86.7 | 56 |
| (variation % between 25 to 70 deg. C.) | −21 | −3 | −10 | −25 | −7 |

TABLE 2-continued

| Tire | Ref.B1 | Ref.B2 | Ref.B3 | Ref.B4 | Ex.B |
|---|---|---|---|---|---|
| Road noise | 100 | 98 | 92 | 95 | 89 |
| Durability | 100 | 101 | 97 | 99 | 105 |

PET: polyethylene terephthalate fiber, PEN: polyethylene-2,6-naphthalate fiber
*1 Each band was made of a single full-width ply formed by spirally winding a 10 mm width tape, and the cord count was 49/5 cm.

Form the test results, it was confirmed that the road noise can be greatly improved while improving or maintaining the durability.

The invention claimed is:

1. A pneumatic tire comprising a tread portion, a pair of sidewall portions, a pair of bead portions each with a bead core therein, a carcass extending between the bead portions, and a belt disposed radially outside the carcass in the tread portion and comprising a breaker and a band, wherein
   (1) the breaker comprises two cross plies of steel cords laid at an angle of from 10 to 35 degrees with respect to the tire equator,
   (2) the band is disposed radially outside of the breaker to cover at least the axial edges of the breaker, the band comprising a PEN cord ply of at least one polyethylene-2,6-naphthalate fiber cord which is wound spirally around the breaker at an angle of not more than 5 degrees with respect to the tire equator, wherein the polyethylene-2,6-naphthalate fiber cord has
   a total denier number of from 2500 to 3600,
   a twist number of from 30 to 40 turns/10 cm,
   an initial stage modulus at 25 deg. C. which is in a range of from 50 to 65 gf/d, and
   a variation of the initial stage modulus in a temperature range between 25 deg. C. to 70 deg. C. which is not more than 20% in absolute value, and
   (3) the carcass comprises a PEN cord ply of polyethylene-2,6-naphthalate fiber cords each having
   a loss tangent of from 0.06 to 0.09,
   a complex elastic modulus of from 2800 to 4000 N/cord,
   a variation of the loss tangent in the temperature range between 25 deg. c. and 70 deg. c. which is not more than 20% in absolute value,
   a variation of the complex elastic modulus in the temperature range between 25 deg. c. and 70 deg. c. which is not more than 20% in absolute value, and
   the polyethylene-2,6-naphthalate fiber cords are arranged radially at an angle of from 70 to 90 degrees with respect to the tire equator, and each of the cords has
   a total denier number of from 2500 to 3600,
   a twist number of from 30 to 40 turns/IO em,
   an initial stage modulus of 25 deg. c. which is in a range of from 50 to 65 gf/d, and
   a variation of the initial stage modulus in a temperature range between 25 deg. c. to 70 deg. c. which is not more than 20% in absolute value.

2. The pneumatic tire according to claim 1, wherein an elongation under load of 2.0 gf/d of the polyethylene-2,6-naphthalate fiber cord in the PEN cord carcass ply is in a range of from 0.5 to 2.5%.

3. A pneumatic tire according to claim 1, wherein the number of the fibers in a polyethylene-2,6-naphthalate fiber cord in the PEN cord carcass ply is in a range of from 400 to 600.

4. A pneumatic tire according to claim 1 wherein an elongation under load of 2.0 gf/d of the polyethylene-2,6-naphthalate fiber cord in the PEN cord band ply is in a range of from 0.5 to 2.5%.

5. A pneumatic tire according to claim 1, wherein in the PEN cord carcass ply, the number of the fibers in a polyethylene-2,6-naphthalate fiber cord is in a range of from 400 to 600, and an elongation under load of 2.0 gf/d of the polyethylene-2,6-naphthalate fiber cord is in a range of from 0.5 to 2.5%, and
   in the PEN cord band ply, an elongation under load of 2.0 gf/d of the polyethylene-2,6-naphthalate fiber cord is in a range of from 0.5 to 2.5%.

6. The pneumatic tire according to claim 1, wherein said PEN cord ply of the carcass extends from one of the bead portions to the other bead portion through the tread portion and sidewall portions.

7. The pneumatic tire according to claim 1, in the PEN cord carcass ply and PEN cord band ply, wherein the material of the PEN cord includes more that 90 mol % of ehtylene-2,6-naphthalate, and has a peak of differential scanning calorimetry (DSC) of not less than 280 deg. C., a limiting viscosity number of not less than 0.7, and an index of double refraction of not less than 0.30.

* * * * *